G. W. B. GEDNEY.
Steam-Plow.
No. 22,867.
Patented Feb. 8, 1859.
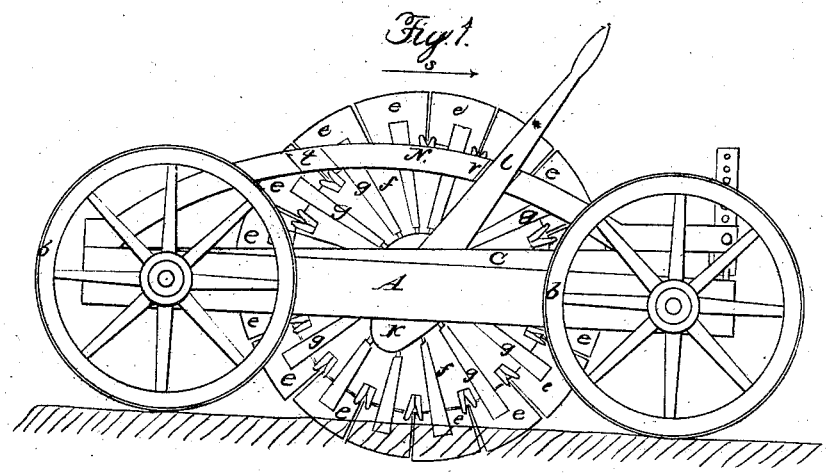
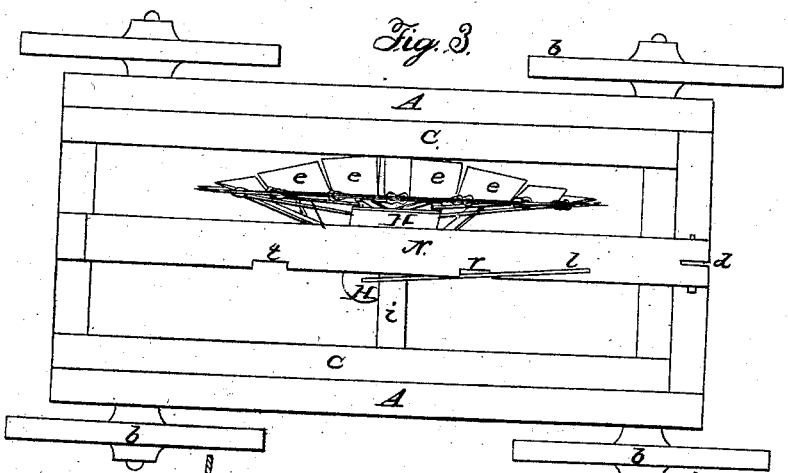
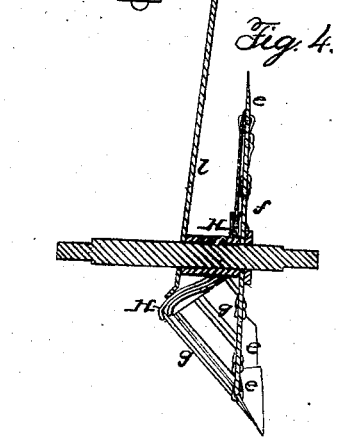
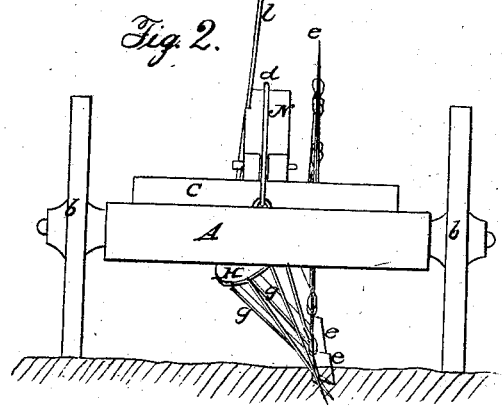

UNITED STATES PATENT OFFICE.

GEORGE W. B. GEDNEY, OF NEW YORK, N. Y.

IMPROVEMENT IN ROTARY SPADING-MACHINES.

Specification forming part of Letters Patent No. 22,867, dated February 8, 1859.

*To all whom it may concern:*

Be it known that I, G. W. B. GEDNEY, of the city, county, and State of New York, have invented a new and useful Agricultural Implement, which I denominate a Rotating Spading-Machine, of which the following is a full, clear, and exact description, reference being had to the accompanying drawings, in which—

Figure 1 represents a side elevation of my machine, Fig. 2 an end elevation thereof, Fig. 3 a plan thereof, and Fig. 4 a cross-section, of the rotating spades at the line $x\ x$ of Fig. 1.

The object of my invention is to produce an agricultural implement to take the place of the ordinary plow, but which shall pierce the soil and separate a slice of earth in a manner analogous to the operation of a spade operated by hand.

My invention consists in a series of spades radiating from a central axis in a ring or circle, which is caused to roll edgewise in the ground, so that each spade in the series is caused in succession to pierce and enter the soil.

My invention consists further in imparting to these spades a lateral movement by means of a cam or other suitable mechanism, so that the slice of soil with which the faces of the spades are in contact is borne sidewise by them from the adjacent soil and turned over.

My invention also consists in a method of reversing the lateral movement of the spades, so that the implement may be moved either end foremost, as desired.

The machine represented in the accompanying drawings embodies my invention. It has a carriage, the frame A of which is supported at a suitable distance above the ground by means of four wheels, $b\ b\ b\ b$. This carriage supports the spade-frame C, which is hinged at one end to the carriage-frame, so that it may be raised or depressed, and is fitted at the other end with an apparatus, by means of which it is maintained in any desired position in reference to the carriage-frame. This apparatus may be a screw turning in a nut. In the present instance it consists of a flat bar, $d$, pierced with holes and hinged at its lower end to the carriage-frame, its upper extremity being received into a mortise in the spade-frame C and made fast thereto by means of a pin inserted through one of the holes.

The spade-frame supports the series of rotating spades $e\ e\ e$, which radiate from a shaft, $i$, that crosses the spade-frame and turns freely in boxes secured thereto. Each spade in the series is hinged to a disk, $f$, which connects it with the shaft. Each also is fitted with a handle, $g$, which projects from the spade toward the central shaft, its inner end being received into the groove of a cam, H, which imparts a lateral movement to the whole series of spades as they revolve. The inner extremities of the handles, which run in the cam-groove should be fitted with friction-wheels to facilitate their movement. The cam H is secured to a sleeve, $m$, which fits upon the spade-shaft $i$, and is prevented from turning with the shaft by means of a lever-handle, $l$. This handle may be turned toward either end of the machine to adjust the position of the cam upon the spade-shaft, so that it may impart the proper lateral movement to the spades, whichever end of the machine is drawn forward. This lever is secured in the proper position to hold the cam by means of a curved beam, N, which is made fast to the spade-frame, and has two sockets in it, in one of which, $r$, the lever is secured when the machine is moving in the direction indicated by the arrow $s$, and in the other, $t$, of which it is secured when the machine is moved in the opposite direction.

When the machine is not at work the spade-frame should be raised sufficiently to permit the spades to clear the ground and should be secured in that position. When the machine is in operation the spade-frame is so set with respect to the carriage-frame that the spades shall project as far below the level of the wheels as it is desired to penetrate the ground, and when the machine is propelled forward its weight causes the edges of the spades to pierce and enter the soil, while at the same time the onward movement of the carriage causes the series of spades to rotate like a wheel so that each spade in succession is brought into operation.

The cam is of such shape as shown in the drawings, and is so set upon the shaft of the spades that when the spades are piercing the soil the spade-handles traverse the straight portion of the cam-groove and the faces of the spades are maintained in a plane which is perpendicular to the surface of the ground or thereabouts, and that as the spades rotate in the ground their handles traverse the portion of the cam-groove that inclines from the disk, by whose action the spades are gradually turned laterally on their hinges so as to pry off the slice of earth which they have severed from the adjacent soil. This lateral movement of spades by the movement of their handles in the groove of the cam becomes greater as in their rotation they rise from their lowest positions, so that their inclined faces constitute what may be termed a "rotating mold-board," by the operation of which the slice is turned over. After the spades leave the soil the returning inclination of the cam-groove restores the spades to their proper positions for entering the soil. If the machine is employed to form successive furrows by causing it to move across a field alternately in opposite directions the position of the cam upon the spade-shaft must be changed by moving the lever-handle before each new furrow is commenced, so that the spades may begin to turn laterally at the proper times; but if the machine is drawn around the ground to be dug the position of the cam must not be changed.

The machine which I have thus described embodies my invention; but the latter is not limited to a machine of this precise form and construction. Thus, for example, cases may arise in which it may be expedient to hang the series of spades outside of the carriage instead of between the wheels thereof, so that the latter may all run upon undisturbed land. It may also be desirable when operating upon tough soils, especially where there is a heavy sod, to make the edges of the spades which pierce the sod of a lancet or fleam form, or in the form of a series of lancets, and, if desirable, the spade-shaft may be connected by gearing with the running-wheels, so that a positive rotary movement is imparted to it. These and other changes may be required to adapt the implement to the peculiarities of the soils in which it is to be used, or to meet the views of different constructors, and may be made without affecting the principle of my invention.

The machine also may be constructed to be drawn along by the force of animals or by steam-power, as desired, and the cam and spade-handles may be inclosed in a globular case extending radially from the shaft to the hinges of the spades to keep out dust and dirt.

What I claim as my invention, and desire to secure by Letters Patent, is—

1. A series of spades which are operated, substantially as herein set forth, so as to descend edgewise into the soil successively in each others track and then to move laterally to detach the slice of soil upon which they operate from the undisturbed land.

2. Combining an endless series of spades operating, substantially as herein set forth, with a cam or its equivalent that controls their positions by means of spade-handles or their equivalents that are connected with the blades of the spades.

3. Adapting the machine to be moved either end forward by constructing the device that imparts lateral movement to the spades in such manner that its position may be changed and that it may be made fast in either position.

In testimony whereof I have hereunto subscribed my name.

G. W. B. GEDNEY.

Witnesses:
H. WHITMAN,
S. VAN WINKLE.